US006954692B2

(12) United States Patent
Dellac et al.

(10) Patent No.: US 6,954,692 B2
(45) Date of Patent: Oct. 11, 2005

(54) METHOD OF MANAGING BRAKE SYSTEM ARCHITECTURE FOR AN AIRPLANE FITTED WITH BRAKES HAVING ELECTROMECHANICAL ACTUATORS, AND AN ARCHITECTURE APPLYING THE METHOD

(75) Inventors: Stéphane Dellac, Toulouse (FR); Jérôme Sibre, Paris (FR); Pierre Girod, Paris (FR)

(73) Assignee: Messier-Bugatti, Velizy-Villaboublay (FR)

( * ) Notice: Subject to any disclaimer, the term of this patent is extended or adjusted under 35 U.S.C. 154(b) by 0 days.

(21) Appl. No.: 10/998,618

(22) Filed: Nov. 30, 2004

(65) Prior Publication Data

US 2005/0192733 A1 Sep. 1, 2005

(30) Foreign Application Priority Data

Dec. 1, 2003 (FR) .................................. 03 14061

(51) Int. Cl.⁷ ............................................. G06G 7/76
(52) U.S. Cl. ..................... 701/70; 701/78; 188/156; 303/9.62
(58) Field of Search ............................. 701/29, 33, 36, 701/70, 71, 76, 78; 303/2, 3, 20, 9.63, 9.62, 303/122, 122.03; 188/156–162

(56) References Cited

U.S. PATENT DOCUMENTS

| | | | | | |
|---|---|---|---|---|---|
| 5,961,190 | A | * | 10/1999 | Brandmeier et al. | ......... 303/152 |
| 6,081,081 | A | * | 6/2000 | Maisch | ....................... 188/162 |
| 6,138,801 | A | * | 10/2000 | Shirai et al. | ................. 188/157 |
| 6,142,026 | A | * | 11/2000 | Ohashi et al. | ............. 73/865.9 |
| 6,219,033 | B1 | * | 4/2001 | Rosenberg et al. | ......... 345/157 |
| 6,402,259 | B2 | * | 6/2002 | Corio et al. | .................. 303/20 |
| 2001/0045771 | A1 | | 11/2001 | Corio et al. | |

\* cited by examiner

Primary Examiner—Richard M. Camby
(74) Attorney, Agent, or Firm—Sughrue Mion, PLLC

(57) ABSTRACT

The invention relates to a method of managing a braking system architecture for an airplane fitted with brakes having electromechanical actuators, in which some of the actuators are connected to a battery assembly of the airplane and other actuators are not connected to the battery assembly of the airplane, which method comprises a step of controlling at least one of the actuators that is not connected to the battery assembly to cause it to exert a force equal to a unit holding force, which force is determined independently of any braking demand from the pilot. The invention also provides an architecture specially adapted to implement the method.

8 Claims, 2 Drawing Sheets

METHOD OF MANAGING BRAKE SYSTEM ARCHITECTURE FOR AN AIRPLANE FITTED WITH BRAKES HAVING ELECTROMECHANICAL ACTUATORS, AND AN ARCHITECTURE APPLYING THE METHOD

The invention relates to a method of managing a brake system architecture for an airplane fitted with brakes having electromechanical actuators, and to an architecture constituting an application of the method.

BACKGROUND OF THE INVENTION

In order to test engines or to hold an airplane stationary immediately before take-off, it is known that, on airplanes fitted with conventional hydraulic brakes, some pilots have become accustomed to actuating the parking brake selector in order to hold the airplane stationary without it being necessary during such testing to keep applying pressure to the brake pedals.

Actuating the parking brake selector connects all of the brakes of the airplane to one or more of the hydraulic accumulators which exert pressure on the pistons of the brakes. The force generated by the pistons on the brake disks is then sufficient to hold the airplane stationary in spite of the thrust from its engines.

For an airplane fitted with brakes that are actuated electromechanically, the situation is more difficult.

A known braking architecture adapted to the particular case of an airplane having two main landing gear units, each fitted with two braked wheels is shown in FIG. 1 of the accompanying drawings.

Each of the wheels 1, 2, 3, and 4 is associated with a brake having four electromechanical actuators (referenced EMA in the figure, being numbered EMA1 to EMA4). The braking architecture has four electrical braking controllers 5, 6, 7, and 8 (referenced ECB in the figure) each controlling half of the actuators for both of the wheels in a corresponding one of the landing gear units. The electrical braking controllers receive braking orders from two braking and steering control units 9, 10 (referenced BSCU in the figure).

The airplane is also fitted with various generators of electricity (not shown) which are driven by the engines of the airplane, enabling first and second power supply buses PWR1 and PWR2 to be provided that are independent of each other, together with a third power supply bus PWREss. Finally, the airplane has an emergency electricity supply, generally comprising a source of direct current (DC) in the form of a battery or a set of batteries (Batt). For segregation purposes, no one controller EBC should be powered by both power supply buses PWR1 and PWR2. Likewise, no one controller EBC should be powered by one of the power supply buses PWR1 or PWR2 and by the DC source Batt. However it is acceptable for a given controller EBC to be powered by the power supply bus PWREss and by the DC source Batt.

This disposition therefore leads to using an architecture of the kind shown in FIG. 1, in which a first controller EBC (referenced 5) is powered by the first power supply bus PWR1, a second controller EBC (referenced 8) is powered by the second supply bus PWR2, and the other two controllers EBC (referenced 6 and 7) are powered by the third power supply bus PWREss and by the DC source Batt.

When the airplane engines are off, only the controllers EBC 6 and EBC 7 and the actuators EMA that are connected thereto can operate, being powered from the DC source, which is the only source that remains available.

Reference can be made to US patent document US-2001/045771A which illustrates such a braking architecture.

In conventional manner, that type of architecture is configured to present various braking modes (normal mode, alternate mode, emergency mode, automatic mode), during which the actuators apply a force to the stack of disks, where the force is established either as a function of signals coming from brake pedals actuated by the pilot, or as a function of a reference value for airplane deceleration, or as a test function reference value. These modes are referred to below as braking modes. They correspond to the nominal function of the brakes which is to absorb at least some of the kinetic energy of the airplane in order to slow it down.

That type of architecture is also configured to present a mode of operation referred to as parking mode during which the electromechanical actuators connected to the battery, i.e. the actuators EMA that are connected to the EBC controllers referenced 6 and 7, are controlled to develop a predetermined unit parking force. This mode is activated whenever the airplane is parked, and its function is to prevent the airplane from moving.

To this end, the architecture includes a selector 11 having two positions marked OFF and PARK. When the selector 11 is in the OFF position, the braking architecture is configured to operate in one of the braking modes, in particular in a normal braking mode during which all of the controllers EBC control the corresponding actuators EMA on the basis of braking reference signals generated by the braking control units BSCU. These reference signals are derived, amongst other things, from signals from pedals actuated by the pilot.

When the selector 11 is in the position PARK, the braking architecture is configured to operate in parking mode for which the two controllers EBC 6 and 7 connected to the battery assembly Batt are programmed to apply a predetermined unit parking force to the actuators EMA that they control.

The use of the actuators EMA that are associated with the controllers connected to the battery assembly, makes it possible to apply a parking force, even when the electricity generators of the airplane are not in operation. This disposition is useful, after the airplane has been moved in a parking area, for preventing it from moving any further, and without it being necessary to start the engines of the airplane.

The actuators EMA are fitted with a mechanical locking mechanism (not shown) which, after the parking force has been applied, serves to lock the actuators EMA in a position where they apply the parking force, thus making it possible to switch off the power supply to the actuators EMA and thus take a load off the battery assembly of the airplane.

By way of example, for an airplane of the Airbus A320 type fitted with brakes, each having four electromechanical actuators, the actuators that are operated in parking mode, i.e. half of the actuators of the airplane, deliver a unit parking force that amounts to substantially 33% of the maximum force they are capable of delivering (which corresponds to braking when take-off has been refused and the airplane is fully loaded), and that suffices to hold the airplane at maximum weight on a parking area having a slope of 3%.

It might therefore be thought, by analogy with airplanes in which the braking architecture is hydraulic, that the airplane could be held during engine run-up by switching to parking mode. However, given the force developed by the engines of the airplane while they are being run up, the unit force required of the actuators exceeds 60% of the maximum force they are capable of delivering.

So either the actuators need to be dimensioned so as to be capable of accommodating such a force, which would be completely unacceptable in terms of weight and power, or else known architectures of braking systems for airplanes fitted with brakes having electromechanical actuators cannot hold the airplane steady during engine run-up solely by making use of parking mode, and they therefore oblige the pilot to keep the brake pedals pressed down during engine run-up.

OBJECT OF THE INVENTION

An object of the invention is to provide a method of managing a braking system architecture for an airplane fitted with brakes having electromechanical actuators, and also to an architecture constituting an application of the method, that enable the limitations of the prior art to be obviated.

BRIEF DESCRIPTION OF THE INVENTION

The invention provides a method of managing a braking system architecture for an airplane fitted with brakes having electromechanical actuators, in which some of the actuators are connected to a battery assembly of the airplane and other actuators are not connected to the battery assembly of the airplane, the method comprising, according to the invention, a step of controlling at least one of the actuators that is not connected to the battery assembly to cause it to exert a force equal to a unit holding force, which force is determined independently of any braking demand from the pilot.

The term "independently of any braking demand from the pilot" is used to mean that the unit holding force is not determined as a function of signals coming from the pilot's pedals, nor is it determined as a function of a deceleration referenced as generated by the braking control unit in response to a request from the pilot for braking at constant deceleration.

Thus, the invention goes against the existing prejudice whereby only the actuators connected to the battery can be operated to develop a force that is not associated with a braking demand from the pilot. The invention opens up the possibility of holding modes that enable the airplane to be held stationary during engine run-up, or during engine testing.

The unit holding force in the present invention may be predetermined, or it may be calculated as a function of thrust from the engines of the airplane.

In a particular implementation of the method of the invention, the method includes the step of controlling the actuators connected to the battery assembly and a certain number of actuators not connected to the battery assembly so as to cause each of the actuators concerned to develop a force equal to the unit holding force, with the number of actuators concerned being sufficient to hold the airplane stationary under the thrust from its engines.

The airplane is thus held stationary by using a number of actuators that is larger than the number of actuators connected to the battery assembly, thus making it possible to reduce the requirement for a unit holding force to a value that is lower and compatible with using actuators of normal dimensions.

The invention also provides an architecture specially adapted to implementing the method of the invention, the architecture including engagement means having at least three different functions, namely:

a mode of operation of the architecture in one or more braking modes during which all of the actuators are controlled to exert a braking force that is essentially variable and that is calculated as a function of braking demand from the pilot or from a control unit of the airplane (in particular when testing braking);

a mode of operation of the architecture in a parking mode during which only those actuators that are powered by the battery assembly are controlled to exert a predetermined unit parking force; and a mode of operation of the architecture in a holding mode during which at least one actuator that is not connected to the battery assembly is controlled to exert a unit force equal to a unit holding force.

In a particular embodiment of the invention, the selector means comprises a three-position selector, with each of the positions corresponding to one of the three modes of operation.

In a second particular embodiment of the invention, the selector means comprises a two-position selector, and the architecture is configured:

when the selector is in a first position, to cause the architecture to operate in one of the braking modes, and when the selector is in a second position:

by default to engage operation of the architecture in a parking mode; and in response to an additional signal representative of engine thrust exceeding a predetermined threshold, to engage operation in holding mode.

In a third particular embodiment of the invention, the selector means comprises a two-position parking selector, and a two-position holding selector, and the architecture is configured:

when the parking selector and the holding selector are in a first position, to engage operation of the architecture in one of the braking modes;

when the parking selector is in a second position, and regardless of the position of the holding selector, to engage operation of the architecture in a parking mode; and when the holding selector is in a second position, and regardless of the position of the parking selector, to engage operation of the architecture in a holding mode.

BRIEF DESCRIPTION OF THE DRAWINGS

The invention will be better understood in the light of the following description given with reference to the figures of the accompanying drawings, in which, in addition to above-described FIG. 1.

DETAILED DESCRIPTION OF THE INVENTION

Figure 1:
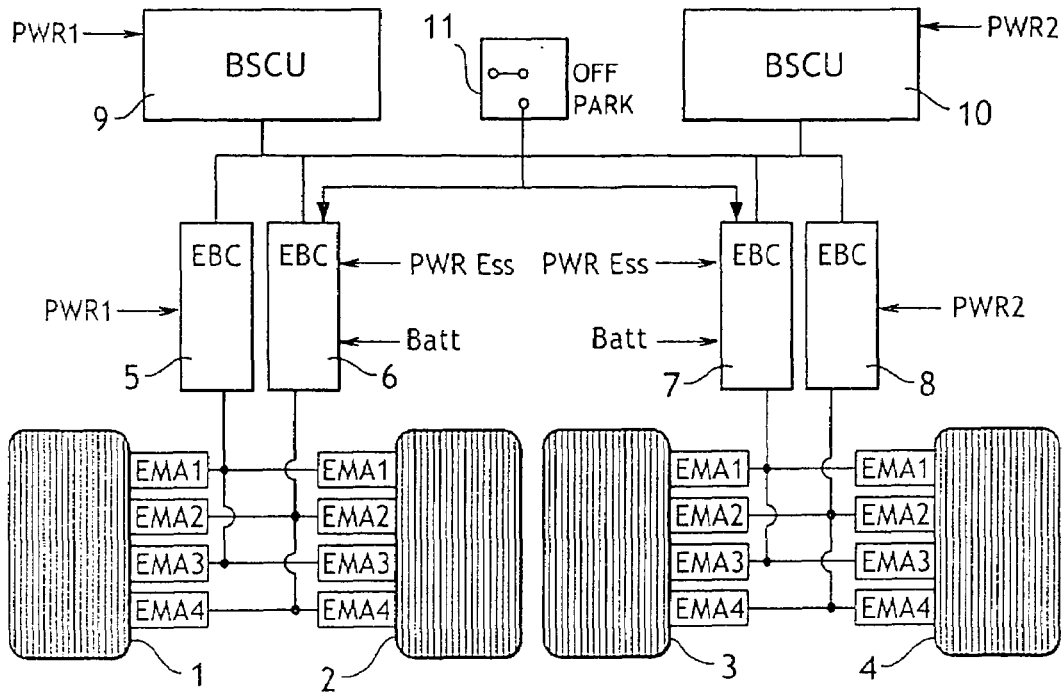
Figure 2:
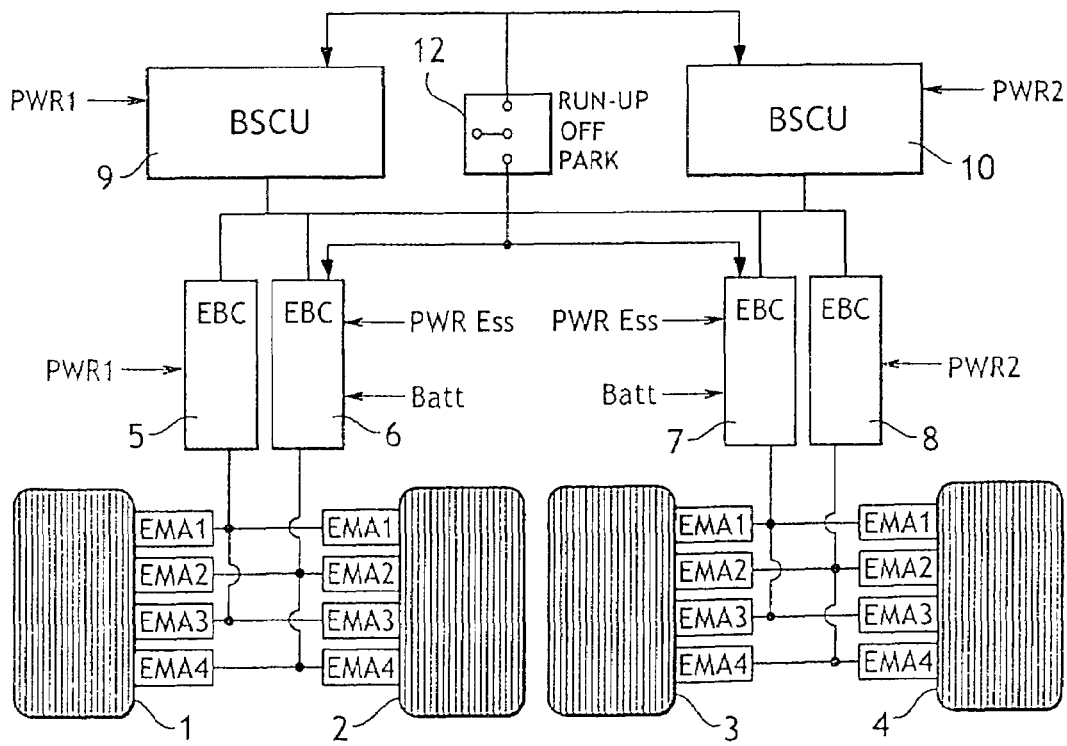
FIG. 2 is a diagrammatic view of a braking architecture in a first particular embodiment of the invention, including a three-position selector.

In a first particular embodiment of the invention, as shown in FIG. 2, in which figure elements that are common with elements in FIG. 1 are given the same names or references, the prior art parking selector 11 is replaced by a three-position selector 12.

The first two positions, OFF and PARK are similar to those of the prior connector and serve, as before, to engage operation either in one of the braking modes or else in parking mode. In accordance with the invention, the selector has a third position marked RUN-UP which engages operation in holding mode, and which is used when testing engines or while running the engines up prior to take-off.

In this mode, the braking control units BSCU 9 and 10 send reference signals to all of the controllers EBC 5, 6, 7, and 8 that are independent of the braking reference signals coming from the pilot, and in particular of the signals from the pedals.

The reference signals are converted by the controllers EBC 5, 6, 7, and 8 into control signals applied to each actuator, causing each actuator to develop a unit holding force.

This unit force is preferably predetermined, and is large enough to ensure that the torque generated by all of the brakes enables the airplane to be held stationary even when its engines are delivering maximum thrust.

In a variant, and in order to limit the electricity consumption of the actuators, the reference may vary as a function of engine thrust, while continuing to be sufficient to hold the airplane constantly stationary. In practice, such a reference signal increases with increasing engine thrust. It may increase either continuously, or in steps.

It can thus be seen that in holding mode, twice as many actuators are in operation as during parking mode.

Returning to the worked example mentioned above, it therefore suffices for holding the airplane during run-up for each actuator to deliver a force of only 80% of the maximum force that the actuators are capable of delivering.

It is thus possible to hold the airplane during run-up without requiring the pilot to keep the brake pedals pressed down.

Figure 3:
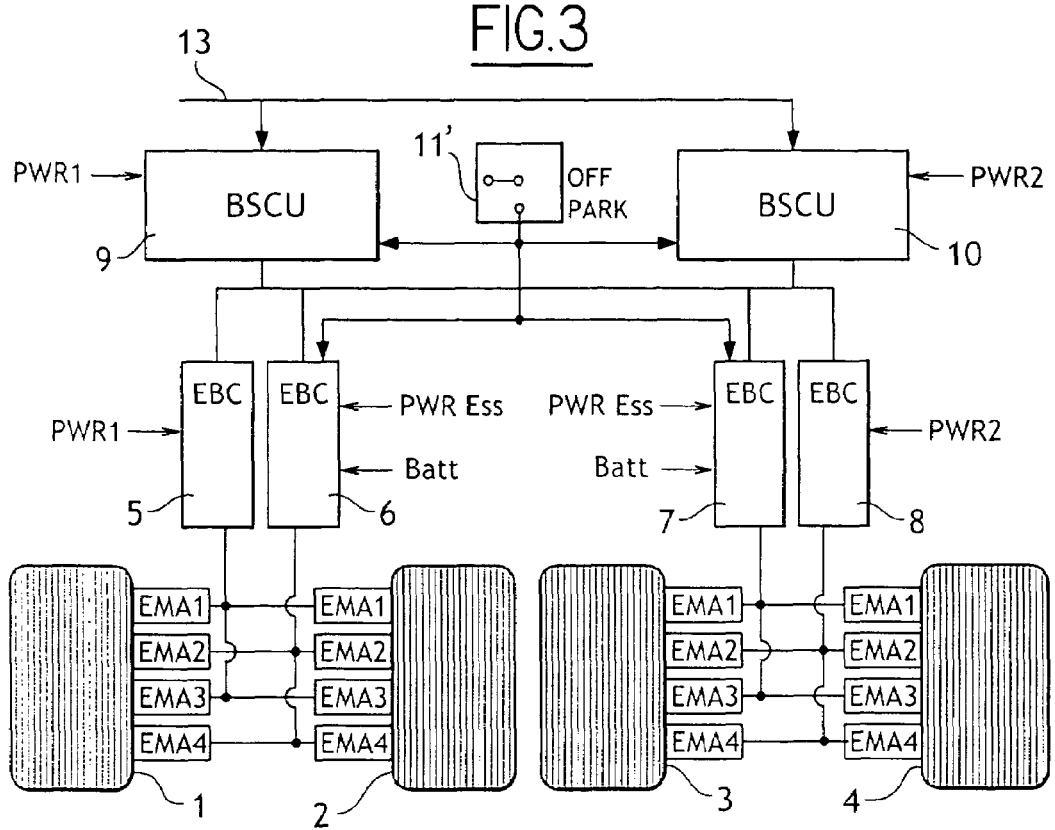
FIG. 3 is a diagrammatic view of a braking architecture in a second particular embodiment of the invention, including a two-position selector.

In a second embodiment shown in FIG. 3, there is a two-position selector 11' as in the prior art. The OFF position always engages normal braking mode. The PARK position serves to engage either parking mode, or else holding mode, under the following circumstances.

A signal 13 representative of thrust from the engines is delivered to the braking control units BSCU 9 and 10. This signal may be derived, for example, from the position of the throttle control lever, from the speed of at least one engine, or from a signal coming from a force or deformation sensor placed in a portion of the airplane which is the subject of such force or deformation under the effect of engine thrust.

In the absence of such a signal, the mode of operation engaged by the architecture is parking mode in which the actuators EMA connected to the battery assembly are controlled to apply a unit parking force.

When said signal arises, the architecture switches automatically from parking mode to holding mode, without there being any need for action on the part of the pilot. The braking control unit BSCU then controls all of the actuators EMA so that each of them develops a holding force. The sequence in which holding force is applied can then be as follows:

The architecture is initially in parking mode, in which the actuators EMA connected to the battery assemblies are mechanically locked, with each developing a unit force equal to the unit parking force.

When the signal representative of engine thrust arises, the braking control units BSCU 9 and 10 act via the controllers EBC 5 and 8 to cause the actuators EMA that are not connected to the battery assembly to develop force equal to the unit holding force, and act via the controllers EBC 6 and 7 to cause the actuators EMA connected to the battery assembly to unlock and increase the force they are developing from the unit parking force to the unit holding force.

All of the actuators are then locked in the position for applying the unit holding force.

Changeover to holding mode is thus completely transparent for the pilot, for whom everything takes place as it would on board an airplane fitted with a braking architecture that is hydraulic and that has only two possible modes of operation: one of the braking modes; or parking mode.

Figure 4:
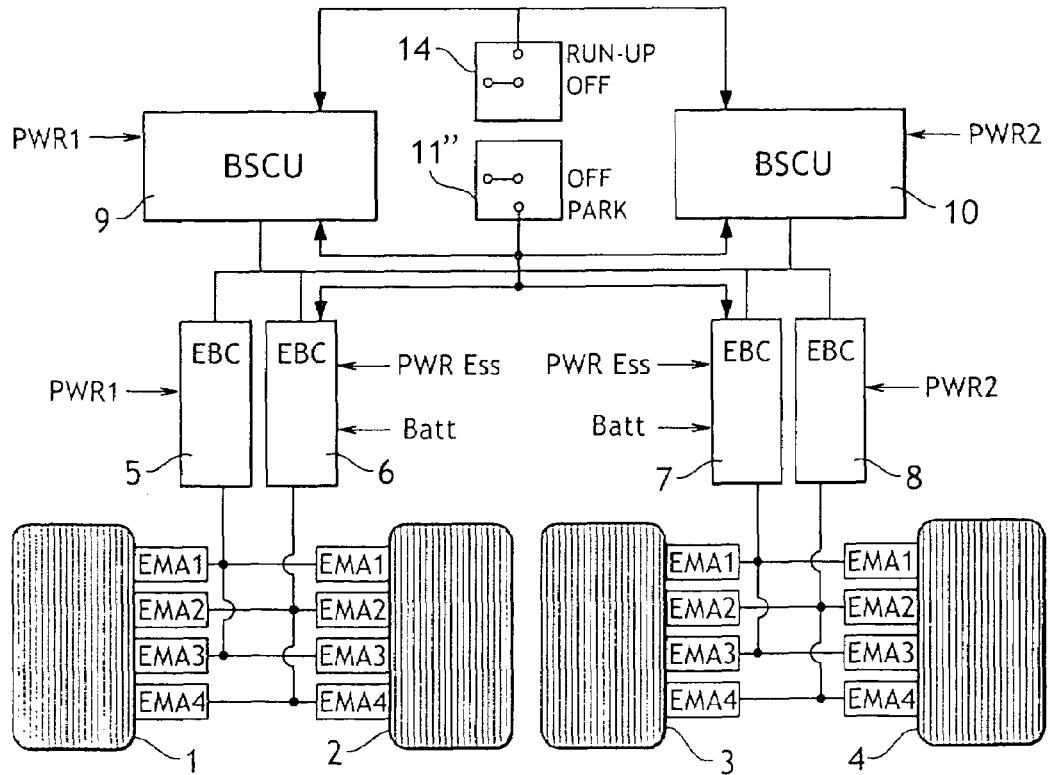
FIG. 4 is a diagrammatic view of a braking architecture in a first particular embodiment of the invention, including two two-position selectors.

In a third particular embodiment shown in FIG. 4, where elements common to elements shown in FIG. 1 are given the same names and references, use is made of two two-position selectors, comprising a parking selector 11" similar to the parking selector of FIG. 1 and, like that selector, having an OFF position and a PARK position, and a holding selector 14 which has an OFF position and a RUN-UP position.

The architecture is configured in such a manner that when both selectors 11" and 14 are in the OFF position, the architecture operates in one of the braking modes.

When the pilot actuates the parking selector 11" to put into the PARK position, the architecture is configured to operate in parking mode, independently of the position of the holding selector 14.

Similarly, when the pilot actuates the holding selector 14 so as to put into the RUN-UP position, the architecture is configured to operate in holding mode, independently of the position of the parking selector The invention is not limited to the particular examples of the invention described above, but on the contrary it covers any variant coming within the ambit of the invention as defined by the claims.

In particular, although in the architecture shown, holding force is applied by means of a reference signal generated by the braking control units BSCU, it is quite possible, by analogy with parking mode, to program the controllers EBC so that they control the actuators concerned to develop a unit holding force in response to holding mode being engaged, without the braking control units BSCU being required to generate any reference signal at all.

Although, in the example shown, holding mode makes use of all of the actuators of the airplane, holding mode could be implemented using only a fraction of the actuators of the airplane.

What is claimed is:

1. A method of managing a braking system architecture for an airplane fitted with brakes having electromechanical actuators, in which some of the actuators are connected to a battery assembly of the airplane and other actuators are not connected to the battery assembly of the airplane, the method comprising a step of controlling at least one of the actuators that is not connected to the battery assembly to cause it to exert a force equal to a unit holding force, which force is determined independently of any braking demand from the pilot.

2. A method according to claim 1, wherein the unit holding force is predetermined.

3. A method according to claim 1, wherein the unit holding force is calculated as a function of the thrust from the engines of the airplane.

4. A method according to claim 1, including the step of controlling the actuators connected to the batter assembly and a certain number of actuators not connected to the battery assembly so as to cause each of the actuators concerned to develop a force equal to the unit holding force, with the number of actuators concerned being sufficient to hold the airplane stationary under the thrust from the engines of the airplane.

5. An architecture specially adapted to implementing the method according to claim 1, the architecture comprising selector means for selecting at least three modes of operation, namely:

- a mode of operation of the architecture in one or more braking modes during which all of the actuators are controlled to exert a braking force that is essentially variable and that is calculated as a function of braking demand from the pilot or from a control unit of the airplane;
- a mode of operation of the architecture in a parking mode during which only those actuators that are powered by the battery assembly are controlled to exert a predetermined unit parking force; and
- a mode of operation of the architecture in a holding mode during which at least one actuator that is not connected to the battery assembly is controlled to exert a unit force equal to a unit holding force.

6. An architecture according to claim 5, wherein the selector means comprises a three-position selector, with each of the positions corresponding to one of the three modes of operation.

7. An architecture according to claim 5, wherein the selector means comprises a two-position selector, and wherein the architecture is configured:

when the selector is in a first position, to cause the architecture to operate in one of the braking modes, and when the selector is in a second position:

by default to engage operation of the architecture in a parking mode; and in response to an additional signal representative of engine thrust exceeding a predetermined threshold, to engage operation in holding mode.

8. An architecture according to claim 5, wherein the selector means comprises a two-position parking selector, and a two-position holding selector, and wherein the architecture is configured:

when the parking selector and the holding selector are in a first position, to engage operation of the architecture in one of the braking modes;

when the parking selector is in a second position, and regardless of the position of the holding selector, to engage operation of the architecture in a parking mode; and when the holding selector is in a second position, and regardless of the position of the parking selector, to engage operation of the architecture in a holding mode.

* * * * *